Aug. 11, 1953
F. A. PALL
2,648,360
SAW WITH A CONCAVED LEADING CHISEL EDGE AND
PLANAR OFFSET SIDE SURFACE ON EACH TOOTH
Filed July 24, 1952
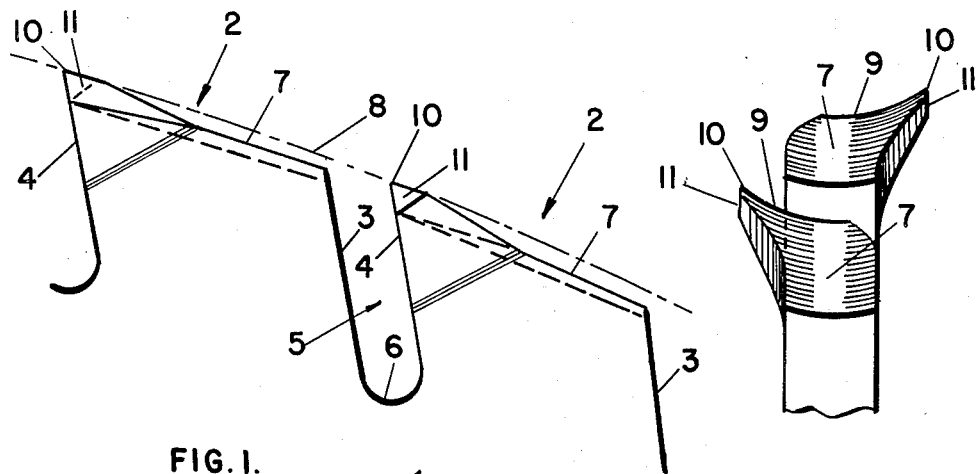
FIG. 1.
FIG. 2.
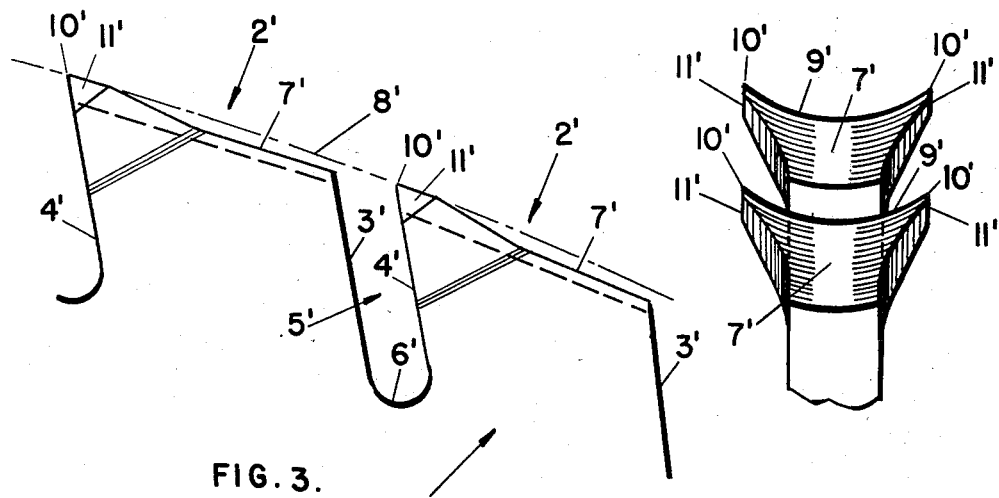
FIG. 3.
FIG. 4.
FRANCIS A. PALL
*INVENTOR*
BY *Francis Pall*

Patented Aug. 11, 1953

2,648,360

UNITED STATES PATENT OFFICE 2,648,360

SAW WITH A CONCAVED LEADING CHISEL EDGE AND PLANAR OFFSET SIDE SURFACE ON EACH TOOTH

Francis A. Pall, San Diego, Calif., assignor of one-half to Isabelle M. Pall, San Diego, Calif.

Application July 24, 1952, Serial No. 300,624

1 Claim. (Cl. 143—140)

The present invention relates to improvements in saws, whereby the teeth have uniform profile and each tooth has a transverse concaved leading chisel edge and a planar offset side surface.

It is the object of my invention, first, to provide a saw, which cuts equally well, smooth and fast in any direction in lumber or like material, thereby making possible the use of one kind of saw within the individual field or workshop; second, to provide a saw which—due to the cresent shaped cutting edges—cuts faster, smoother, with less power requirement and in addition it will do more than twice the amount of work per sharpening than a saw of prior art; third, to provide a saw, whereby—due to the continuous and even slicing action of the unique transverse concaved leading chisel edges—the dangerous kick-back is entirely eliminated; fourth, to eliminate the changes of the blades for rip or cross cut, etc.; fifth, to save labor, time and material, also to increase and improve production. Further objects will appear as the description proceeds.

In the heretofore proposed saws, whenever raised tips of the teeth were deemed necessary, it was created by alternate beveling of the front faces or the backs of the teeth or both. This required two separate and accurately matched operations on the sharpening machine for each sharpening, which requires additional time and skilled labor.

It is known to all skilled in the art, that in the process of swaging or the setting of the teeth, due to the variation in the hardness or the malleability in the steel, also the variation in the blow of the swaging or setting tool, will result in uneven swaging or setting, consequently the outward leaning needle like points of the teeth will cut the characteristic ridges with irregular depth all through the kerf, which will be more prominent with the faster feed or wobbling of the material, and wider spacing of the teeth.

The feature of the present invention may be realized in the characteristic hollow-ground backs of the teeth, which eliminates the alternate bevel, consequently making it possible to sharpen the saw with one setting of the sharpening machine, thereby saving the matched second operation, and simultaneously producing an absolute uniform set of teeth, with all the cutting edges in the same relative position, and as a result, each tooth cuts its share and wears evenly without throwing excess strain on the others.

Another important characteristic feature of this invention is the termination of the cutting edges in flat planes, parallel to the body portion, resulting in an exceptionally smooth cutting saw, without the characteristic slow action, and high friction connected with heat and high power requirements of the heretofore proposed devices.

Still another feature of this invention is the possibility of the speedy and flawless resharpening of the saw with a simple machine, with a single operation, which operation is entirely independent from the size and uniform spacing of the teeth and does not require the heretofore indispensable rounding or as sometimes called "jointing" of the saw before sharpening and each tooth—due to the single operation— will have all the cutting edges and the raised tips in the same relative position.

By reducing the invention into actual practice, due to the required single and simple operation of the sharpening machine claimed in my co-pending application, Ser. No. 361,684, filed June 15, 1953, for Self-Jointing Integral Saw Sharpener, applicant resharpened a 10 inch saw having 100 teeth in less than 10 minutes of interruption in the operation of the table saw, which is the evidence that a high number of teeth in a circular saw is no handicap, but on the contrary, the efficiency and the smooth operation of a saw will be increased in proportion with the number of properly shaped and located cutting edges.

One form of the invention is illustrated in the accompanying drawing, where Fig. 1 is the side elevation of two adjacent teeth in a saw, in accordance with invention, having spring set teeth. Fig. 2 is the rear view of Fig. 1; Fig. 3 is the side elevation of two teeth in a saw, in accordance with this invention, having swaged teeth. Fig. 4 is the rear view of Fig. 3. Referring to Fig. 1, it will be seen that the body portion, generally at 1, having uniform profile teeth, generally at 2, spaced along the rim and preferably substantially possessing a quadrilateral form, where the rear face 3 and the front face 4 are rearwardly inclined and forming the chip space in between, generally at 5, terminated in a semicircular gullet 6. The feature of this invention is perfectly carried out in the manner shown in the drawing, where it will be seen that the sloping hollow-ground back 7, extends below the cutting line 8, and the intersection of the front face 4, and the hollow-ground back 7, will create the novel concaved leading chisel edges 9, terminated in the tip 10, formed by the planar offset side surface 11, parallel to the body 1. It is noted here, that the spring set of the tooth, in accordance with this invention, is greater than it is recommended in the prior art, but on each side it is less than half of the thickness of the body, which thereafter will be trimmed back to about half way, thereby terminating the concaved leading chisel edge 9, in the tip 10.

In Fig. 3 and Fig. 4, where for the simplicity of presentation the corresponding numerals are duplicated with the addition of a prime ('), Fig. 3 is the side elevation of two swaged teeth, having essentially the same elements as Fig. 1, namely the body 1', preferably with uniform quadrilaterally shaped teeth at 2', the rear face 3', front face 4', chip space 5', and gullet 6'. It is noted here, that the swage—similarly to the spring set—will be wider than in the prior art, which thereafter also will be trimmed back, terminating the concaved leading chisel edge in tips 10', forming the planar offset side surface 11', on each side of the tooth.

The feature of the invention is carried out in similar manner, in the hollow-ground back 7'. Here also, the intersection of the inclined front face 4' and said hollow-ground back 7' extends below the cutting line 8', and creates the concaved leading chisel edge 9', which however, will be comparatively longer than on the spring set tooth, so that each tooth cuts across the full width of the kerf.

In operation—due to the maximum possible hook, combined with the hollow-ground back, forming the keen concaved leading chisel edges—the raised tips will begin to sever the fiber first at the edges of the kerf, then gradually cut inward with a slicing action towards the center in a plowing motion, without any of the roughness, characterized by the tearing action of the conventional teeth. The saw in accordance with this invention has all its cutting edges, tips, and sides of the teeth in perfect alignment and each cut overlaps the other to such an extent that it is hardly visible to the naked eye, resembling a sanded surface.

The size and spacing of the teeth are of secondary importance. For deep and fast cut, where more chip space is required, the large teeth with deep gullets are recommended, as in the primary conversion of logs into timber and lumber. The medium and moderately spaced teeth are proposed for the secondary conversion of lumber into the finished product, and finally the small teeth are recommended where an exceptionally smooth finish is the prime factor.

The quadrilateral shape of the tooth shown in a circular saw in this application, is not a limitation but rather an illustration preferred by the applicant, and it is clear to anyone skilled in the art, that the hollow-ground back, resulting in a concaved leading chisel edge, could be applied to many other forms of saw tooth heretofore proposed, therefore the application of a concaved leading chisel edge and planar offset side surface on each tooth will be within the scope of this invention.

What applicant claims as his invention:

A saw as a new article of manufacture, consisting of a body portion, thereon uniform profile teeth in spaced relation along the rim, the back of each tooth sloping and extending below the cutting line and forming an acute angle with the planar front face and an obtuse angle with the rear face of the tooth, having a hollow-ground surface, forming a transverse concaved leading chisel edge with the inclined front face of said tooth, having each said transverse concaved leading chisel edge terminated in a planar offset side surface parallel to the body portion of the saw, having chip space formed by the front and rear face of two adjacent teeth.

FRANCIS A. PALL.

References Cited in the file of this patent

UNITED STATES PATENTS

| Number | Name | Date |
|---|---|---|
| 149,120 | Hatch | Mar. 31, 1874 |
| 192,526 | Pool | June 26, 1877 |
| 492,407 | Mallette | Feb. 28, 1893 |
| 646,373 | Phillips | Mar. 27, 1900 |

FOREIGN PATENTS

| Number | Country | Date |
|---|---|---|
| 812,964 | France | Feb. 15, 1937 |
| 866,663 | France | May 26, 1941 |